United States Patent
Suttie et al.

(10) Patent No.: US 6,777,822 B1
(45) Date of Patent: Aug. 17, 2004

(54) CONTROL SYSTEM FOR AN AUXILIARY POWER UNIT

(75) Inventors: Peter Suttie, San Diego, CA (US); Dennis E. Schmidt, San Diego, CA (US); Michael E. Mehrer, San Diego, CA (US); Tarrence LaMar Mack, Santee, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 10/404,353

(22) Filed: Apr. 1, 2003

(51) Int. Cl.[7] .............................................. F01K 23/00
(52) U.S. Cl. .................. 290/40 A; 290/40 B; 290/40 R
(58) Field of Search ............................ 290/40 A, 40 R, 290/40 B, 55, 44, 52

(56) References Cited

U.S. PATENT DOCUMENTS

| | | |
|---|---|---|
| 2,797,382 A | 6/1957 | Woerdemann |
| 3,655,991 A | 4/1972 | Schneider |
| 3,714,541 A | 1/1973 | Kuwabara et al. |
| 3,879,616 A * | 4/1975 | Baker et al. ............... 290/40 R |
| 4,305,001 A | 12/1981 | Vamaraju et al. |
| 4,370,560 A * | 1/1983 | Faulkner et al. .......... 290/40 C |
| 4,402,288 A | 9/1983 | Ohgami et al. |
| 4,404,797 A | 9/1983 | Payne et al. |
| 4,593,180 A | 6/1986 | Narita et al. |
| 4,663,536 A | 5/1987 | Roesel, Jr. et al. |
| 4,775,826 A | 10/1988 | Klema |
| 5,422,778 A | 6/1995 | Good et al. |
| 5,444,595 A | 8/1995 | Ishikawa et al. |
| 5,546,742 A | 8/1996 | Shekhawat et al. |
| 5,747,972 A | 5/1998 | Baretich et al. |
| 5,899,411 A * | 5/1999 | Latos et al. ............... 244/53 A |
| 5,939,800 A | 8/1999 | Artinian et al. |
| 5,977,645 A * | 11/1999 | Glennon .................... 290/40 F |
| 6,037,752 A | 3/2000 | Glennon |
| 6,184,661 B1 | 2/2001 | Becker et al. |
| 6,229,681 B1 | 5/2001 | Lee |
| 6,278,262 B1 | 8/2001 | Ullyott |
| 2001/0024107 A1 | 9/2001 | Jabaji |

* cited by examiner

Primary Examiner—Nicholas Ponomarenko
Assistant Examiner—Heba Elkassabgi
(74) Attorney, Agent, or Firm—Carlson, Gaskey & Olds

(57) ABSTRACT

An APU system provides an APU which drives a permanent magnet generator, an APU controller and a fuel controller. The APU controller controls the APU speed through communication with the fuel controller to maintain the generator voltage output within specified limits in response to an engine speed set point signal, a voltage set point signal and a voltage output signal.

9 Claims, 1 Drawing Sheet

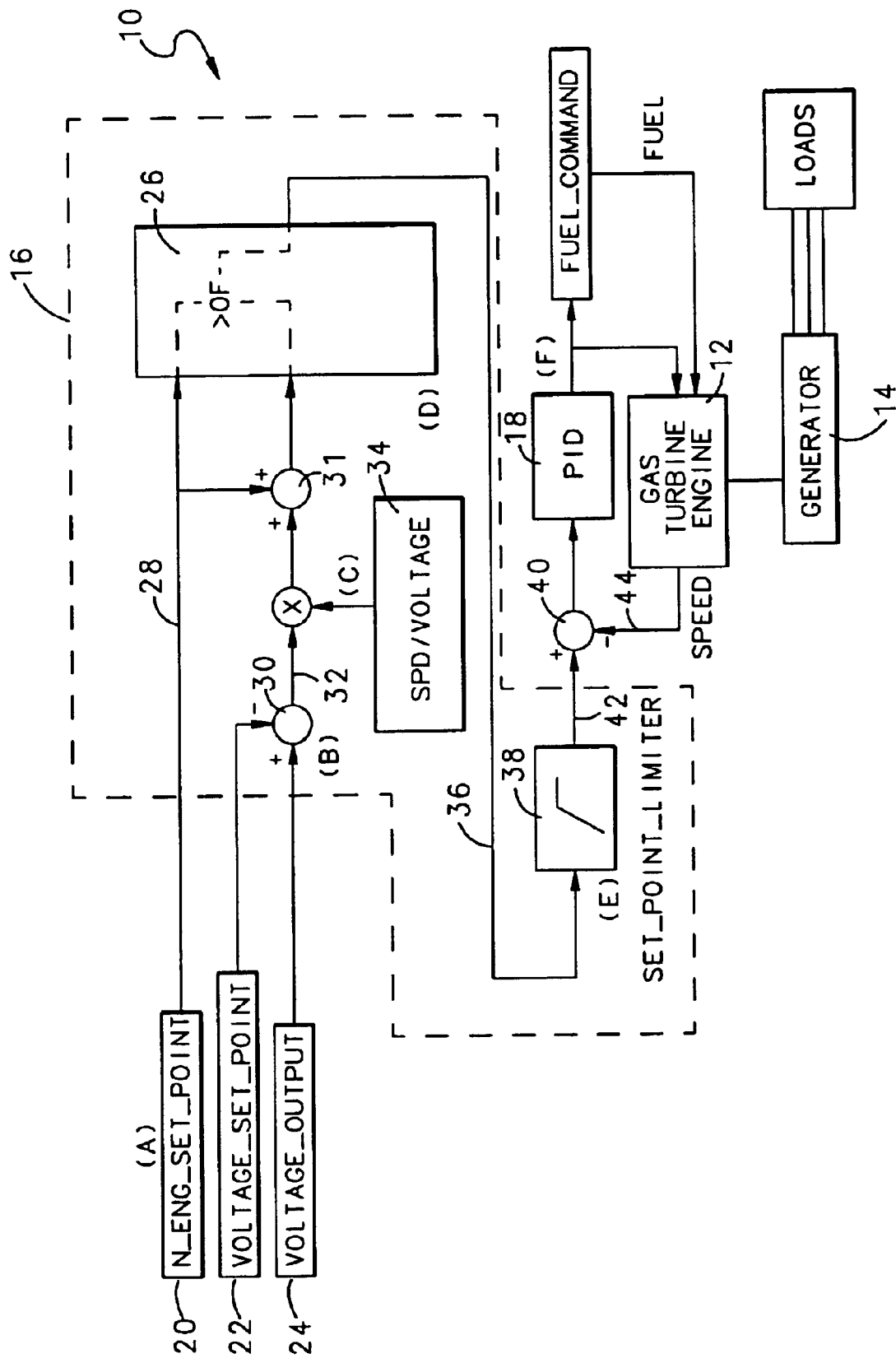

CONTROL SYSTEM FOR AN AUXILIARY POWER UNIT

BACKGROUND OF THE INVENTION

The present invention relates to an auxiliary power unit, and more particularly to a control system for an auxiliary power unit which utilizes a permanent magnet generator.

An Auxiliary Power Unit (APU) system is often utilized in conjunction with main propulsion engines to provide a secondary power source. An APU system, typically in the form of an independent gas turbine engine, provides shaft power to drive an electric generator and interconnected electrical systems.

Some APU systems utilize a permanent magnet generator driven directly by the gas turbine engine. A directly driven generator minimizes the requirement for a relatively complicated gearbox, clutch interconnections, and result in lighter and more compact APU systems. APU speed excursions adversely affect the permanent magnet generator output By design, the APU during electrical load generation is constrained to relatively strict speed limits in order to meet the permanent magnet generator electrical output requirements.

The permanent magnet generator output capability is dependent on the gas turbine engine operation. Large transient load applications or load sheds can produce electrical demand changes that affect the level of APU generator output voltage. If the gas turbine engine control system does not respond to changes in the electrical load, the APU generator output voltage can deviate outside of specified limits and fail to provide sufficient power to meet electrical system requirements.

Accordingly, it is desirable to provide a control system for an APU system with a permanent magnet generator which maintains the generator output voltage within specified limits regardless of the load drawn by the vehicle.

SUMMARY OF THE INVENTION

The APU system according to the present invention provides an APU system which drives a permanent magnet generator, an APU controller and a fuel controller. The APU is preferably an independent gas turbine engine, separate from an associated main engine, such as a main vehicle propulsion engine.

As the current drawn from the generator increases due to the addition of applied loads to the generator, the output voltage will fall. The APU controller of the present invention controls the APU speed through communication with the fuel controller to maintain the generator voltage output within specified limits in response to an engine speed set point signal, a voltage set point signal and a voltage output signal.

The present invention therefore provides a control system for an APU system with a permanent magnet generator which maintains the generator output voltage within specified limits regardless of the load current being drawn by the aircraft.

BRIEF DESCRIPTION OF THE DRAWING

The various features and advantages of this invention will become apparent to those skilled in the art from the following detailed description of the currently preferred embodiment. The drawing that accompanies the detailed description can be briefly described as general schematic view of the APU system and control system therefore.

DETAILED DESCRIPTION OF THE PREFERRED EMBODIMENT

FIG. 1 illustrates a general schematic view of an auxiliary power unit system (APU) 10 which preferably forms part of an aircraft, and operates as an additional power source for the aircraft. It should be understood that the APU system 10 could be used in other applications, such as in a stationary generating station, a ground vehicle, or ground based unit for starting a vehicle or the like.

The APU system 10 includes an APU 12 which drives a permanent magnet generator 14, an APU controller 16 and a fuel controller 18. The permanent magnet generator 14 also preferably operates as a motor to provide initial rotation of the APU 12 for start up.

The APU 12 is preferably a small gas turbine engine, separate from an associated main engine, such as a vehicle propulsion engine. It should be understood that the APU 12 need not be a turbine engine and, in some applications, could be formed using a conventional four stroke or other engine having a rotational output.

As the current drawn from the generator 14 increases due to the addition of applied loads, the output voltage starts to fall. APU controller 16 controls the APU 12 speed through communication with the fuel controller 18 to maintain the generator voltage output within specified limits.

The APU controller 16 receives a plurality of signals including an engine speed set point signal 20 a voltage set point signal 22 and a voltage output signal 24. The engine speed set point signal 20 is preferably 100% operating speed for the APU 12. The voltage set point signal 22 is preferably the system requirement voltage which is typically 28V in an aircraft. The voltage output signal 24 is the voltage presently being generated by the generator 14.

The engine speed set point signal 20 is communicated to a comparator 26 on a line 28. The voltage set point signal 22 and the voltage output signal 24 are compared at an adder 30 to generate an error on line 32 where off-speed operation occurs when the generator voltage varied from the voltage set point.

The error from the adder 30 is multiplied by a gain 34 that relates voltage offset to speed set point which is preferably defined as speed divided by voltage. The result of the voltage offset multiplied by the gain represents the speed offset. The comparator 26 compares the engine speed set point signal 20 on line 28 to the output of the sum of the speed set point signal 20 and the speed offset from adder 31 and selects the greater.

The resultant speed set point output from the comparator 26 is communicated to a limiter 38 on line 36. The limiter 38 protects the APU 12 from overspeed. Typically, the APU 12 commonly utilized on aircraft may be driven between 95% and 105% of full speed. The output from limiter 38 is communicated to an adder 40 on line 42. Adder 40 subtracts the speed of the APU 12 on line 44 from the limited output of the comparator 36 and communicates the error to the fuel controller 18 which is preferably a proportional-integral-differential control which provide a closed loop control of fuel to the APU 12 with engine speed feedback.

APU speed is therefore increased to increase the output voltage of the APU generator under high load conditions which maintains the output voltage within specified limits. Such a system is particularly useful during propulsion engine start, high load and emergency situations where the APU 12 is temporarily and intermittently driven at a higher (>100%) speed to assure a proper voltage supply.

The forgoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of controlling an APU system having a permanent magnet generator comprising the steps of:
   (1) determining a speed offset of an APU in response to an applied load to the permanent ma et alternator;
   (2) selecting the greater of the speed offset of said step (1) and an APU set point to obtain a resultant speed set point greater then 100% of a full speed; and
   (3) communicating the resultant speed set point to an APU fuel controller.

2. A method as recited in claim 1, wherein said step (1) further comprises:
   relating a voltage offset to a speed set point to obtain the speed offset.

3. A method as recited in claim 1, wherein said step (1) further comprises:
   determining an error between a generator voltage and a voltage set point; and
   multiplying the error by a gain that relates voltage offset to a speed set point to obtain the speed offset.

4. A method as recited in claim 1, wherein the voltage set point of is 28V.

5. A method as recited in claim 1, wherein said step (3) further comprises:
   relating the resultant speed set point to an engine speed feedback signal.

6. A method as sated in claim 1, wherein said step (3) further comprises:
   relating the resultant speed set point with a proportional-integral-differential control to an engine speed feedback signal.

7. A method as recited in claim 1, wherein said step (2) further comprises:
   obtaining a resultant speed set point between 95% and 105% of a full speed.

8. A method of controlling an APU system comprising a permanent magnet generator comprising the steps of:
   (1) determining an error between a generator voltage and a voltage set point;
   (2) multiplying the error of said step (1) by a gain that relates voltage offset to a speed set point to obtain a speed offset in relation to an applied load to the permanent magnet alternator;
   (3) selecting the greater of the speed offset of said step (2) and an APU speed set point to obtain a resultant speed set point greater than 100% of a full speed;
   (4) comparing the resultant speed set point to an APU speed feedback; and
   (5) communicating the difference between the resultant speed set point and the APU speed feedback of said step (5) with a proportional-integral-differential fuel controller to drive the APU to a speed which maintains the voltage output of the permanent magnet generator within pre-defined limits of the voltage set point.

9. A method as recited in claim 8, wherein said step (3) further comprises:
   obtaining a resultant speed set point between 95% and 105% of a full speed.

* * * * *

UNITED STATES PATENT AND TRADEMARK OFFICE
CERTIFICATE OF CORRECTION

PATENT NO. : 6,777,822 B1 Page 1 of 1
DATED : August 17, 2004
INVENTOR(S) : Suttie et al.

It is certified that error appears in the above-identified patent and that said Letters Patent is hereby corrected as shown below:

Column 3,
Line 17, "ma et" should be -- magnet --

Column 4,
Line 3, "sated" should be -- recited --

Signed and Sealed this

Fourteenth Day of December, 2004

JON W. DUDAS
*Director of the United States Patent and Trademark Office*